United States Patent [19]

Dufner

[11] Patent Number: 5,294,580
[45] Date of Patent: Mar. 15, 1994

[54] METHOD FOR MAKING ALLOYED CATALYSTS

[75] Inventor: Bryan F. Dufner, Hartford, Conn.

[73] Assignee: International Fuel Cells Corporation, South Windsor, Conn.

[21] Appl. No.: 743,331

[22] PCT Filed: Jun. 21, 1991

[86] PCT No.: PCT/US91/04398
§ 371 Date: Aug. 8, 1991
§ 102(e) Date: Aug. 8, 1991

Related U.S. Application Data

[63] Continuation-in-part of Ser. No. 541,869, Jun. 21, 1990, abandoned.

[51] Int. Cl.$^5$ ............................................. H01M 4/88
[52] U.S. Cl. ........................................ 502/101; 429/44
[58] Field of Search .................. 429/44; 502/101, 185

[56] References Cited

U.S. PATENT DOCUMENTS

| | | | |
|---|---|---|---|
| 4,316,944 | 2/1982 | Landsman et al. | 429/44 |
| 4,447,506 | 5/1984 | Luczak et al. | 429/44 |
| 4,513,094 | 4/1985 | Luczak | 502/101 |
| 4,985,386 | 1/1991 | Tsurumi et al. | 424/44 |

OTHER PUBLICATIONS

Patent Abstracts of Japan, vol. 13, No. 169 (C-587) (3517) Apr., 1989, For Kokai 63-319052, 63-319051.

*Primary Examiner*—Stephen Kalafut
*Attorney, Agent, or Firm*—Pamela J. Curbelo

[57] ABSTRACT

Adjustment of the noble metal catalytic activity in the production of noble metal alloyed catalyst preparation using alloying metals capable of multiple valence states improves the alloying metal loading. A noble metal is precipitated from a liquid onto a support. Prior to the addition of an alloying metal which is capable of a low valence state having low solubility and a high valence state having high solubility, the catalytic activity of the noble metal precipitate is reduced. Reduction is accomplished by adjusting the temperature and/or pH of the liquid such that a minimal amount of the alloying metal will be converted from the lower to the higher valence state. By maintaining the alloying metal in the lower valence state, a greater amount of the alloying metal which has been dissolved into the liquid is precipitated onto the support, thereby attaining high loadings, reducing waste of the alloying metal, making the loadings predictable, and making the waste liquid more environmentally sound.

10 Claims, No Drawings

METHOD FOR MAKING ALLOYED CATALYSTS

This is a continuation-in-part of U.S. patent application Ser. No. 541,869, filed Jun. 21, 1990, abandoned as of the filing date accorded this application.

TECHNICAL FIELD

The present invention relates to the preparation of a high capacity noble metal alloyed catalyst without the use of a noble metal precursor.

BACKGROUND OF THE INVENTION

Noble metal alloy catalyst preparation has typically consisted of first preparing or more commonly, purchasing, a noble metal precursor. The precursor was formed by precipitating a noble metal from solution onto a support, reducing the precipitated noble metal to the metal form with a reducing agent, such as formaldehyde. The precursor was the dispersed in a solution of alloying metals and the solvent was boiled away to disperse the alloying metals onto the precursor. Finally, the precursor with the alloying metals was heated in a calciner to alloy the metals.

Noble metal alloy catalysts have been produced without the use of a precursor. These catalysts were produced by precipitating a noble metal compound and alloying metals from solution and using a reducing agent to reduce the noble metal. The solution was then dried and calcined to alloy the metals.

Although this process required less steps, no precursor was formed and all the metals were deposited in one process, it also produced an environmentally harmful waste product. The liquid solution which contained a reducing agent such as formaldehyde had to be disposed of.

However, it was believed that the reducing agent was essential in attaining a high activity catalyst. The reducing agent seemed to precondition the support and/or the noble metal allowing high activity catalysts to be produced. Without the use of the reducing agent, the alloy metal loadings were low and inconsistent, and the catalyst had a low activity.

Additionally, there was a fear that if the noble metal was not reduced to its metal form prior to calcination, the noble metal surface area would be significantly reduced due to sintering, again lowering the resulting catalytic activity.

Therefore, what is needed in this art is an improved method of catalyst production which consistently and predictably produces high performance catalysts through simple, environmentally sound processes.

DISCLOSURE OF THE INVENTION

According to the present invention, noble metal alloy catalysts are produced by reducing the catalytic activity of the noble metal precipitate. A support and noble metal compound are intimately contacted in a liquid. The noble metal is precipitated onto the support. The catalytic activity of the noble metal is adjusted and at least one alloying metal is dissolved in the liquid. The alloying metal is precipitated onto the support. The supported noble metal and alloying metal precipitates are then calcined to reduce and alloy the metals.

BEST MODE FOR CARRYING OUT THE INVENTION

It is a common belief that in order to attain a high surface area noble metal alloyed catalyst, such as an alloyed platinum catalyst, a noble metal precursor must be used. However, it has been discovered that a high performance catalyst can be obtained in a single step process.

The present invention teaches a method of producing high performance noble metal alloy catalysts without a noble metal precursor by reducing the catalytic activity of the noble metal once it has been precipitated onto a support.

The process consists of dispersing a high surface area support into a liquid. High surface area supports with surface areas greater than about 50 m2/g are preferred, and with surface areas greater than about 80 m2/g especially preferred. Such supports could be those found to be useful in the preparation of catalysts for use in fuel cells, and would be known to those skilled in this art. Various types of supports, such as silica and alumina among others, can be utilized with this process, with carbon base supports preferred since they provide the necessary reducing environment during calcination. Some such carbon based supports available commercially include: acetylene-black produced by Gulf Oil Corporation, Pittsburgh, Pa., and VULCAN® XC-72 oil furnace black produced by Cabot Corporation, Boston, Mass. These carbon-based supports can be used in their as received condition or may be graphitized to increase their oxidation resistance prior to adsorption of the metals.

A solution of noble metal is prepared and added to the dispersion. Preparation consists of dissolving a noble metal compound into a liquid. Noble metals include iridium, gold, silver, rhodium, ruthenium, osmium, palladium, platinum, and mixtures thereof, with platinum preferred. The noble metal is typically in the form of a salt, organometallic complex, hydroxide, etc., such as: platinum(IV) bromide, platinum(IV) chloride, hexachloroplatinate, chloroplatinic acid, among others. Note, an alternative preparation method could consist of dissolving the noble metal compound directly into the dispersion instead of first preparing a noble metal solution.

The solution will contain a sufficient amount of noble metal to yield a loading of about 5 wt % to about 25 wt % noble metal on the support. Preferably, a loading of less than a about 25 wt % is employed since at about 25 wt % or higher, the noble metal will sinter. quickly yielding only marginal addition performance. The preferred noble metal loading (noble metal/support wt %) is also a function of support saturation. As the noble metal loading increases, the support becomes saturated.

The liquid into which the support is dispersed and the noble metal is dissolved, can be any liquid in which the pH can be adjusted, and the metals can be dissolved and precipitated. Possible liquids include: water, alcohols such as methanol, ethanol, and isopropanol among others, and combinations thereof. Water is preferred for economic and environmental safety reasons.

After dissolution of the noble metal compound, the pH of the solution is adjusted sufficiently to chemically convert the dissolved noble metal compound to an insoluble noble metal compound which separates from the solution, hereafter referred to as precipitates. This noble metal precipitate is generally in the form of an oxide, hydroxide, or complex thereof, although other forms are feasible. Generally, the pH is adjusted to be moderately alkaline, between about 7.5 and about 10.5, with between about 8.5 and about 9.5 preferred.

Adjustment of the pH is accomplished with the addition of a compound which does not interfere with the alloying of the noble and alloying metals and does not form a soluble species of the metals. Preferably, sodium or potassium alkali are used. It is especially preferred that sodium hydroxide, potassium hydroxide, sodium carbonate, or sodium bicarbonate is used.

In addition to adjusting the pH, the temperature of the solution is typically adjusted to increase the rate of reaction, thereby reducing the precipitation time. Generally, the liquid is heated to between about 50° C. and the liquid boiling point, with between about 88° C. and about boiling preferred. Preferred precipitation temperatures can readily be determined by one skilled in this art.

Once the noble metal has been precipitated onto the support, the catalytic activity of the noble metal precipitate is adjusted. It is believed that the poor loading of alloying metals and the low activity of the resulting catalysts is a result of the catalytic activity of the noble metal precipitate. Where the alloying metal is capable of multiple valence states, the noble metal precipitate will act as a catalyst and convert the alloying metal valence state from a low to a high valence state.

Therefore, where the alloying metal's low valence state has a low solubility and high valence state has a high solubility, it is preferable to maintain the alloying metal in the low valence state. Once the alloying metal precipitates, maintenance in the low valence state keeps the alloy metal precipitate as insoluble as possible. As a result, alloying metal loadings are increased, alloying metal loadings on the final catalyst are predictable, the need for excess alloying metal is eliminated, and the amount of alloying metal discarded as waste in the liquid is decreased.

If the catalytic activity is not adjusted, the valence state may convert to the higher valence state, the alloying metal solubility would increase and the metal would redissolve into the liquid. The alloying metal loading therefore decreases, a greater amount of alloying metal is discarded as waste or must be recovered, and the alloying metal loading of the final catalyst is unpredictable. Therefore, it is advantageous to control the catalytic activity of the noble metal precipitate.

Controlling the catalytic activity of the noble metal precipitate generally consists of reducing that activity to minimize the valence state conversion. The catalytic activity of the noble metal is controlled by adjusting the temperature and/or pH of the liquid. By adjusting the temperature and pH of the liquid, the kinetics of the reaction can be controlled to reduce the rate which the alloying metal changes valence states. Therefore, where the catalytic activity of the noble metal is reduced to a minimum under feasible operating, conditions, the conversion of the alloying metal to a higher, more soluble valence state is reduced to often minimal amounts.

Representative alloying metals which exist in multiple valence states with the higher valance state being more soluble include: chromium and vanadium, among others. The alloying metals include those selected from the Transition Groups IB, IIIB, IVB, VB, VIIB, and VIII, and Group IIB or the Periodic Table of Elements, among others. These metals can be in any form which is soluble in the solution, and are typically in the form of salts, organometallic complexes, hydroxides, etc.; such as chromium nitrate, cobalt nitrate, and iron chloride.

Reduction of the catalytic activity of the noble metal precipitate is preferably to where the catalytic activity of the noble metal is minimal, and therefore conversion to a higher valences state is minimal. In these circumstances, a noble metal catalytic activity of zero is of course preferred. However, such an activity is generally not attainable. Therefore, the pH and temperature of the liquid are adjusted such that the lowest feasible catalytic activity within the required manufacturing range is obtained.

For example, for a platinum-cobalt-chromium alloyed catalyst, it is necessary to reduce the catalytic activity of the platinum to prevent the chromium from converting to the +6 valence state. Under manufacturing conditions, 25° C. to 95° C. and pH between 5.5 and 9.5, chromium exists in the +6 valence state (assuming an aerated, oxidative environment; air). Yet, chromium in the +6 valence state is soluble in water. However, chromium in the +3 valence state is not soluble in water. But, if chromium in the +3 valence state is precipitated onto a support with platinum at high temperature and pH, near boiling and pH about 9, the platinum acts as a catalyst and the chromium converts to the +6 valence state and redissolves into the water.

Reduction of the catalytic activity of the platinum reduces the rate of conversion from the +3 to the +6 valence state. Therefore, if chromium in the +3 valence state is precipitated onto a support with platinum at below about 50° C. and pH between about 5.5 and about 6.0, essentially all of the chromium remains on the support. Generally, less than about 2 wt % of the chromium will redissolve or fail to precipitate.

An additional factor which may be controlled to adjust the catalytic activity of the noble metal precipitate is the length of time the noble metal precipitate contacts the alloying metal in the liquid. The less time available for the noble metal precipitate to contact the alloying metal, the less time for the alloying metal to change valence states, the less alloying metal redissolves into solution, and therefore, the better the alloying metal loading. Therefore, a minimal time period is preferred, lasting only long enough to precipitate the alloying metal. The process of introducing the alloying metals to the liquid consists of either dissolving them in a solvent and adding the solution to the liquid or dissolving them directly in the liquid. Such solvents will likely be the same as those used for dispersing of the support and dissolving the noble metal compound, or similar compatible liquids.

The loading of the alloying metals is dependent on the type of catalyst. Typically, the alloying metals loading will range from about 1 wt % to about 15 wt %, with the balance noble metal and support.

Once the alloying metal compound(s) have been dissolved in the solution, the pH and/or the temperature can again be adjusted to precipitate the alloying metal(s). Typically, the pH is adjusted to approximately neutral, between about 5.5 and about 8.0.

As with the precipitation of noble metal compound, the temperature of the solution can be adjusted to accelerate the rate of reaction. The temperature is typically maintained between about ambient and about the liquid boiling point, and is preferably maintained below about 50° C. Note, pH and temperature adjustment, contemplates not only the desire to precipitate the alloying metal, but also the catalytic activity at those temperatures and pHs.

During the dispersion, dissolution, and precipitation processes, the liquid is preferably continuously agitated. Continuous agitation prevents the support from settling, temperature hot spots, and dead zones of no mixing, and achieves intimate contact between the metals and the support. This agitation can be accomplished by any method commonly known in the art, such as continuous stirring, ultrasonic blending, and circulation pump/impeller blade combination, among others.

Once the alloying metals have been precipitated onto the support, the solids are washed. Washing the solids removes contaminants, such as chlorides, which can decrease the active surface area of the final catalyst. Typically, water is used in the washing process. However, agents, such as ammonium bicarbonate, sodium nitrate, and volatile organics, can be added to the wash water to facilitate the rate of filtering and to assist in removing contaminants.

Following the wash, the solids are calcined at a temperature and for a time sufficient to reduce the noble metals and alloying metals, and to then alloy the reduced metals. The calcination process is a function of time, temperature, amount of and composition of noble metal on the support, alloy composition, and the inert gas flow. Typically, the calcination temperatures range from about 870° C. to about 950° C. for noble metal alloyed catalysts. Note however, the calcination temperature is dependent upon the type of alloy catalyst. Therefore, lower or higher temperatures may be preferable. The preferred calcination temperature are readily determinable by an artisan. Additionally, depending upon the catalyst, it may be desirable to include in the calcination process a preheating step wherein the catalyst is heated to about 260° C. for about 5 minutes to several hours to reduce some of the metals. A catalyst which this has been found advantageous with is the platinum-iridium-chromium catalyst.

The calcination time period is similarly dependent upon the type of catalyst and can be readily be determined by an artisan. A factor which must be considered when determining the proper time range for calcination is the poor alloying which may occur with short time periods due to the insufficient reducing time for the base metals and/or the insufficient crystal lattice structure reordering time. Additionally, long time periods can cause the alloy surface area to sinter. The time period typically ranges from about 15 minutes to several hours. For example, the calcination time period to prepare a platinum-chromium-cobalt alloyed catalyst ranges from about 30 minutes to about 2 hours.

The inert atmosphere is typically maintained in the calciner by flowing inert gas through the calciner. Possible inert gases, including helium, neon, argon, krypton, xenon, nitrogen, and mixtures thereof can be utilized in the calcination process, with nitrogen preferred. Note, in instances where the calcination is run in low temperatures, about 260° C., hydrogen is a feasible alternative gas.

If more than one alloying metal is to be alloyed, and that alloying metal is preferrably in the higher valence state which has lower solubility, that alloying metal should be added to the liquid and precipitated prior to the adjustment of the catalytic activity of the noble metal precipitate. Additionally, if the alloying metal is not capable of multiple valence states, it is not necessary to adjust the catalytic activity of the noble metal precipitate, and the alloying metal can be added either before or after the adjustment of the catalytic activity of the noble metal precipitate.

Whether reduction of the catalytic activity of the noble metal precipitate prior to the addition of a particular alloying metal is necessary is readily determinable by an artisan. Such an artisan would typically refer to open literature, such as Pourbaix diagrams, and utilize thermodynamic properties to determine the predominant valence state of the alloying metal at given operating conditions. The artisan would also determine which valence state of the alloying metal is least soluble. With this information the artisan determines if the alloying metal should be added to the liquid before or after the catalytic activity of the noble metal is reduced. Note, the compound used to reduce the pH in the present invention may act as a reducing agent to a small degree, but that is not the requirement of this compound. Its purpose is to adjust the pH of the liquid such that the metals will precipitate. This possible side reaction is not important. The fact that a reducing agent such as formaldehyde, formic acid, and alcohols, such as methanol and ethanol, are not utilized helps to make this process more environmentally sound.

The invention will be clarified by reference to the following illustrative examples. These examples are given to illustrate the method of making alloyed catalysts where the catalytic activity of the noble metal precipitate is reduced. They are not, however, intended to limit the generally broad scope of the present invention.

EXAMPLE I

The following example of the present invention has been used to prepare a platinum-cobalt-chromium (Pt-Co-Cr) supported catalyst having an atom ratio of 50:30:20 respectively. The resulting catalyst had a platinum loading of 9.5 wt % on carbon, and an atom ration of 504.30:20, Pt:Co:Cr. (see A in the Table)

1. 400 (g) graphitized VULCAN was dispersed ultrasonically in 13.6 liters of distilled water.
2. The dispersion was heated to near boiling (90° C.).
3. 120 g of chloroplatinic acid was diluted in 100 ml of distilled water. The dilution was then added to the dispersion to achieve 10 wt % platinum on carbon.
4. The pH of the dispersion was adjusted by the addition of approximately 70 grams of sodium hydroxide dissolved in 100 ml of water, and the dispersion was maintained at near boiling for 75 minutes.
5. The dispersion was cooled to 75° C.
6. 40.5 g of cobalt (II) nitrate was dissolved in 100 ml of distilled water and 37.1 g of chromium (III) nitrate was dissolved in 100 ml of distilled water.
7. The cobalt nitrate and chromium nitrate mixtures were then added to the dispersion to achieve a 30 and 20 atom ratio, respectively, to platinum metal.
8. The pH of the dispersion was adjusted with approximately 10 g of sodium hydroxide dissolved in 100 ml of water and maintained in the range between 6.7 and 7.1.
9. After 15 minutes, the solids were filtered, washed with 2 wt % ammonium hydroxide, and dried.
10. The dried solids were then calcined at 900° C. for 1 hour.

EXAMPLE II

The following example of the present invention has been used to prepare a platinum-cobalt-chromium supported catalyst having an atom ratio of 55:25:20 respectively. The resulting catalyst had a platinum loading of 11.3 wt % on carbon, and an atom ration of 22:20, Pt:Co:Cr. (see B in the Table)
1. 450 (g) graphitized VULCAN was dispersed ultrasonically in 15.0 liters of distilled water.
2. The dispersion was heated to near boiling (90° C.).
3. 140 g of chloroplatinic acid was diluted in 100 ml of distilled water. The dilution was then added to the dispersion to achieve 10.5 wt % platinum on carbon.
4. The pH of the dispersion was adjusted to 7.8 by the addition of approximately 65 grams of sodium hydroxide dissolved in 100 ml of water, and the dispersion was maintained at near boiling for 45 minutes.
5. The dispersion was rapidly cooled to 60° C.
6. 36.1 g of cobalt (II) nitrate was dissolved in 100 ml of distilled water and 43.8 g of chromium (III) nitrate was dissolved in 100 ml of distilled water.
7. The cobalt nitrate and chromium nitrate mixtures were then added to the dispersion to achieve a 26 and 20 atom ratio, respectively, to platinum metal.
8. The pH of the dispersion was adjusted with approximately 15 g of sodium hydroxide dissolved in 100 ml of water and maintained in the range between 7.0 and 9.1.
9. After 5 minutes, the solids were filtered, washed with 2 wt % ammonium hydroxide, and dried.
10. The dried solids were then calcined at 900° C. for 1 hour.

EXAMPLE III

The following example of the present invention has been used to prepare a platinum-cobalt-chromium supported catalyst having an atom ratio of 50:30:20 respectively. The resulting catalyst had a platinum loading of 20.5 wt % on carbon, and an atom ration of 51:29:20, Pt:Co:Cr. (see C in the Table)
1. 112 (g) graphitized VULCAN was dispersed ultrasonically in 5.7 liters of distilled water.
2. The dispersion was heated to near boiling (90° C.).
3. 79.1 g of chloroplatinic acid was diluted in 100 ml of distilled water. The dilution was then added to the dispersion to achieve 21.0 wt % platinum on carbon.
4. The pH of the dispersion was adjusted by the addition of approximately 38.5 grams of sodium hydroxide dissolved in 100 ml of water. The pH of the dispersion ranged from an initial value of 10.3 to a final value of 4.9. The dispersion was maintained at near boiling for 45 minutes.
5. The dispersion was rapidly cooled to 50° C.
6. 26.7 g of cobalt (II) nitrate was dissolved in 100 ml of distilled water and 24.6 g of chromium (III) nitrate was dissolved in 100 ml of distilled water.
7. The cobalt nitrate and chromium nitrate mixtures were then added to the dispersion to achieve a 30 and 20 atom ratio, respectively, to platinum metal.
8. The pH of the dispersion was adjusted with approximately 15 g of sodium hydroxide dissolved in 100 ml of water and maintained in the range between 5.5 and 6.0.
9. After 10 minutes, the solids were filtered, washed with 2 wt % ammonium hydroxide, and dried.
10. The dried solids were then calcined at 900° C. for 1 hour.

The following Table describes the half-cell activity for catalyst lots (A–C) prepared according to Example I. A comparison is made to catalyst lots (D–H) purchased from Johnson Matthey, Inc. (Wayne, Pa.). Both the oxygen activity and air performance are significantly improved.

TABLE

| Catalyst | Pt-Loading | Pt—Co—Cr Atom Ratio | Pt Surface Area m2/mg-pt | Half-Cell Analysis 02 Activity @ 900 mv mA/mg | Air Performance @ 200 mA/cm2 mv |
| --- | --- | --- | --- | --- | --- |
| A | 9.5% | 50-30-20 | 44 | 36 | 743 |
| B | 11.3% | 58-22-20 | 52 | 37.8 | 746 |
| C | 20.5% | 51-29-20 | 50.5 | 33.1 | 738 |
| A–C Average | | | 48.8 | 35.6 | 742 |
| D | 10.1% | 54-28-18 | 69 | 36.5 | 735 |
| E | 9.5% | 47-19-34 | 49 | 29 | 733 |
| F | 9.6% | 46-20-34 | 46 | 18.4 | 713 |
| G | 10.3% | 55-21-24 | 47 | 31.2 | 724 |
| H | 10% | 55-24-21 | 51 | 31.7 | 729 |
| D–H Average | | | 52 | 29.4 | 727 |

EXAMPLE IV

The following example of the present invention was used to prepare a platinum-iridium-chromium (pt-Ir-Cr) supported catalyst having an atom ratio of 50:30:20 respectively. The resulting catalyst had a platinum loading of 11.3 wt % on carbon, and an atom ratio of 56:25:19, Pt:Ir:Cr. The half-cell oxygen activity at 900 mV was 37 ma/mg, while the air performance was 728 mA/cm2.
1. 171 (g) graphitized VULCAN was dispersed ultrasonically in 5.7 liters of distilled water.
2. The dispersion was heated to near boiling (90° C.).
3. 20.0 g chloroplatinic acid was diluted in 100 ml of water and was added to the dispersion to achieve a 10.5 wt % platinum on carbon.
4. The pH of the dispersion was adjusted by the addition of 24.9 grams of sodium hydroxide. The pH ranged from an initial value of 9.3 to a final value of 4.8. The dispersion was maintained at near boiling for 20 minutes.
5. 11.8 g of iridium (III) chloride dissolved in 100 ml of water was added to the dispersion to achieve a 30 atom ratio to platinum metal and chromium (see below).
6. The pH of the dispersion was adjusted with 10.9 g sodium hydroxide. The pH ranged from an initial 5.8 to a final value of 4.9. The dispersion was maintained at near boiling for 20 minutes.
7. The dispersion was cooled to 50° C.
8. 2.16 g of chromium (III) nitrate dissolved in 100 ml of water was then added to the dispersion to achieve a 20 atom ratio chromium with respect to the platinum and iridium.

9. The pH of the dispersion was adjusted with 5.3 g of sodium hydroxide diluted in 100 ml of water. The pH was maintained between 5.5 and 6.0.
10. After 10 minutes, the solids were washed with distilled water, dried, and then calcined. Calcination included a 30 minute heating at 260° C. in a hydrogen gas blanket.

EXAMPLE V

The following example of the present invention can be used to prepare a platinum-vanadium supported catalyst having an atom ratio of 70:30 respectively.
1. 450 (g) graphitized VULCAN is dispersed ultrasonically in 15 liters of distilled water.
2. The dispersion is heated to near boiling (90° C.).
3. 140 g of chloroplatinic acid is diluted in 100 ml of distilled water. The dilution is then added to the dispersion to achieve 10.5 wt % platinum on carbon.
4. The pH of the dispersion is adjusted by the addition of 65.0 grams of sodium hydroxide. The pH of the dispersion will range from about an initial 9.5 to about a final 5.0. The dispersion is maintained at near boiling for 20 minutes.
5. 25.5 g vanadium (III) chloride is dissolved in 100 ml water. The solution is then added to the dispersion to achieve a 30 atom ratio to platinum metal.
6. The pH of the dispersion is adjusted to about 7.5 with the addition of 6.5 g sodium hydroxide. The dispersion temperature is cooled to about 50° C. after approximately 20 minutes.
7. After 15 minutes, the solids are washed, dried, and then calcined at 900° C. for 1 hour.

EXAMPLE VI

The following example of the present invention can be used to prepare a platinum-vanadium-cobalt supported catalyst having an atom ratio of 50:30:20 respectively.
1. 450 (g) graphitized VULCAN is dispersed ultrasonically in 15 liters of distilled water.
2. The dispersion is heated to near boiling (90° C.).
3. 140 g of chloroplatinic acid is diluted in 100 ml of distilled water. The dilution is then added to the dispersion to achieve a 10.5 wt % platinum on carbon.
4. The pH of the dispersion is adjusted by the addition of 65.0 grams of sodium hydroxide. The pH ranges from about an initial 9.5 to a final value of about 5.0, having remained above about 7.0 for less than 10 minutes. The dispersion is maintained at near boiling for 20 minutes.
5. 25.5 g vanadium (III) chloride is dissolved in 100 ml of distilled water.
6. The pH is adjusted by the addition of about 6.5 g sodium hydroxide dissolved in 100 ml of water, to a set value of 7.5. Consecutively with the adjustment of the pH, the temperature of the dispersion is cooled to 50° C. Time from vanadium addition to 50° C. is approximately 20 minutes.
7. 31.5 g cobalt nitrate is dissolved in 100 ml of distilled water and added to the dispersion to achieve a atom ratio of 50:30:20, platinum:vanadium:cobalt.
8. The pH of the dispersion is adjusted to and maintained between 5.5 and 6.0 with the addition of about 8.5 g of sodium bicarbonate.
9. After 10 minutes, the solids are washed, dried, and then calcined at 900° C. for 1 hour.

Many of the advantages of the present invention can be seen in the above examples. These advantages include the ability to produce a high activity alloyed catalyst without first preparing a noble metal precursor, the elimination of the need to use a reducing agent such as formaldehyde, formic acid, or alcohols, and the ability to precipitate essentially all of the metals out of the liquid on to the support thereby consistently producing a high activity catalyst and a more environmentally safe waste liquid. With respect to the metals remaining in or re-dissolving into solution, the amount which redissolves into solution is generally less than 2 wt %, and often less than 1 wt %.

Additionally, as can be seen in Examples III and IV, it is not necessary to maintain the pH of the liquid at a given pH during the precipitation of the noble metal. This is advantageous in that is simplifies the manufacturing process. It only requires the addition of a given amount of a compound to initially adjust the pH. It is not necessary to continually monitor the liquid and adjust the pH to obtain a high noble metal loading.

Where a reducing agent is not used and a catalyst is produced without adjusting the catalytic activity of the noble metal as is taught in the present invention, up to 30 wt % or more of the alloying metal re-dissolves into solution. This is a waste of the alloying metal, and it produces inconsistent catalyst loadings and a waste disposal problem for the liquid with the alloying metal in it.

Even though this method has proven particularly useful in the production of catalysts for use in fuel cells, it is clear that this process can be utilized in the production of virtually any noble metal catalyst. It is additionally forseen that this process can be useful in the production of a catalyst where a non-noble metal is acting as a catalyst and altering the valence state of other metals used and causing them to dissolve into solution.

Although this invention has been shown and described with respect to detailed embodiments thereof, it will be understood by those skilled in the art that various changes in form and detail thereof may be made without departing from the spirit and scope of the claimed invention.

I claim:
1. A method for making a noble metal alloyed catalyst using a noble metal having a catalytic activity, and at least one alloying metal, wherein at least one of the alloying metals has at least two valence states with the alloying metal in a low valence state having a solubility in a liquid and having a higher valence state with a higher solubility in the liquid, which comprises:
  a. intimately contacting a supporting and a noble metal compound in the liquid;
  b. precipitating the noble metal, wherein said noble metal precipitate adsorbs onto said support;
  c. reducing the catalytic activity of the noble metal precipitate to inhibit said noble metal precipitate from converting the valence state of the alloying metal to the higher valence state;
  d. introducing the soluble alloying metal compound into said liquid to form an alloying metal solution;
  e. precipitating said alloying metal, wherein said alloying metal precipitate adsorbs onto said support; and
  f. calcining said support with the noble metal and alloying metal precipitates to form an alloyed catalyst;

whereby said soluble alloying metal compounds introduced to said liquid subsequent to the reduction of the catalytic activity of the noble metal precipitate.

2. A method as in claim 1 wherein said noble metal is selected from the group consisting of platinum and palladium.

3. A method as in claim 14 wherein said catalytic activity is reduced by adjusting the temperature of the liquid.

4. A method as in claim 1 wherein said catalytic activity is reduced by adjusting the pH of the liquid.

5. A method as in claim 1 wherein at least one alloying metal is added to the liquid and precipitated onto said support prior to reducing the catalytic activity of the noble metal and at least one alloying metal having at least two valence states is added to the liquid and precipitated onto said support after adjusting the catalytic activity of said noble metal.

6. A method as in claim 11 wherein calcining said support with the noble metal and alloying metal precipitates includes the step of heating said support to 500° C. under a hydrogen atmosphere for between 10 minutes and 3 hours.

7. A method as in claim 1 wherein:
 a. said noble metal is precipitated by heating the liquid to approximately boiling and adjusting the pH of the liquid;
 b. the catalytic activity of said noble metal precipitate is reduced by adjusting the temperature of the liquid; and
 c. said alloying metal is precipitated by adjusting the pH of said alloying metal solution.

8. A method as in claim 1 wherein:
 a said noble metal is precipitated by heating the liquid to approximately boiling and adjusting the pH of the liquid;
 b. the catalytic activity of said noble metal precipitate is reduced by adjusting the pH of the liquid; and
 c. said alloying metal is precipitated by adjusting the temperature of the alloying metal solution.

9. A method for making a noble metal alloyed catalyst as in claim 1 wherein a second alloying metal having one valence state is added to said liquid, wherein said second alloying metal can be added to said liquid at any time after the precipitation of the noble metal.

10. A method for making a noble metal alloyed catalyst as in claim 1 wherein a second alloying metal has a low valence state with a solubility in said liquid and is in higher valence state having a lower solubility in said liquid, wherein said second alloying metal is added to said liquid prior to the reduction of the catalytic activity of the noble metal precipitate.

* * * * *